United States Patent
Baracca et al.

(10) Patent No.: US 11,781,597 B2
(45) Date of Patent: Oct. 10, 2023

(54) SYSTEM FOR SECURING TOGETHER BY MEANS OF PRESS-FITTING A CASING AND A COVER OF A HOUSING ELEMENT

(71) Applicant: Aktiebolaget SKF, Gothenburg (SE)

(72) Inventors: Fausto Baracca, Massa (IT); Andrea A. Bertolini, Carrara (IT); Fabio Falaschi, Carrara (IT); Pasquale Frezza, Aversa (IT); Alessio Nebbia Colomba, Pisa (IT)

(73) Assignee: AKTIEBOLAGET SKF

( * ) Notice: Subject to any disclaimer, the term of this patent is extended or adjusted under 35 U.S.C. 154(b) by 367 days.

(21) Appl. No.: 17/006,948

(22) Filed: Aug. 31, 2020

(65) Prior Publication Data
US 2021/0062868 A1    Mar. 4, 2021

(30) Foreign Application Priority Data

Sep. 3, 2019   (IT) .......................... 102019000015412

(51) Int. Cl.
*F16C 35/02*   (2006.01)
*F16B 4/00*    (2006.01)
(Continued)

(52) U.S. Cl.
CPC .............. *F16C 35/02* (2013.01); *F16B 4/004* (2013.01); *F16C 33/72* (2013.01); *F16C 35/00* (2013.01)

(58) Field of Classification Search
CPC .......... F16C 35/02; F16C 33/72; F16C 35/00; F16B 4/004
See application file for complete search history.

(56) References Cited

U.S. PATENT DOCUMENTS 5,380,103 A    1/1995 Lederman
5,711,618 A *  1/1998 Waskiewicz .......... F16C 35/045
                                                384/489
(Continued)

FOREIGN PATENT DOCUMENTS

CN    105673698 A  *  6/2016  .............. F16C 23/08
JP    H11218141        8/1999

OTHER PUBLICATIONS

Machine Translation of CN-105673698-A PDF File Name: "CN105673698A_Machine_Translation.pdf".*

(Continued)

*Primary Examiner* — Grant Moubry
*Assistant Examiner* — Ruben Picon-Feliciano
(74) *Attorney, Agent, or Firm* — Reed Smith LLP

(57) ABSTRACT

A housing element for applications in the manufacturing industry having a casing and a cover both made of metallic material, wherein the casing is provided with a groove and a flat mounting surface and the cover is provided with an end portion having a frustoconical side wall, an oblique annular bottom wall, and a securing system consisting in inserting the end portion of the cover inside the groove of the casing, wherein an interference (i) between a radially outer end of the end portion of the cover and a radially inner end of the flat mounting surface of the casing assumes values of between 0.2 mm and 0.5 mm and an angle (δ) defined between the frustoconical side wall of the end portion of the cover and the flat mounting surface of the casing assumes values of between 45° and 80°. The interference and the angle facilitate the insertion of the end portion of the cover inside the groove of the casing.

14 Claims, 3 Drawing Sheets

(51) Int. Cl.
  *F16C 33/72* (2006.01)
  *F16C 35/00* (2006.01)

(56) References Cited

U.S. PATENT DOCUMENTS

| 8,979,686 B2 | 3/2015 | Swane |
| 9,452,580 B2 | 9/2016 | Swane |
| 2011/0070987 A1 | 3/2011 | Swane |

OTHER PUBLICATIONS

Search Report for corresponding Italy application No. 102019000015412 dated Apr. 30, 2020.

* cited by examiner

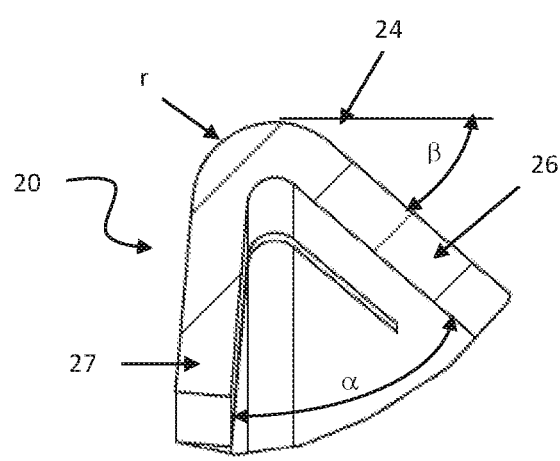
Fig. 3 (Det. A)
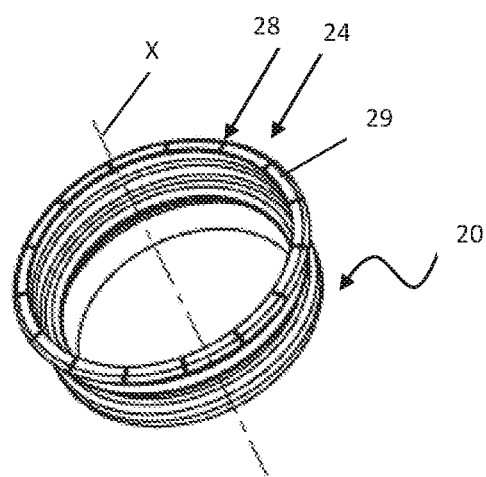
Fig. 4
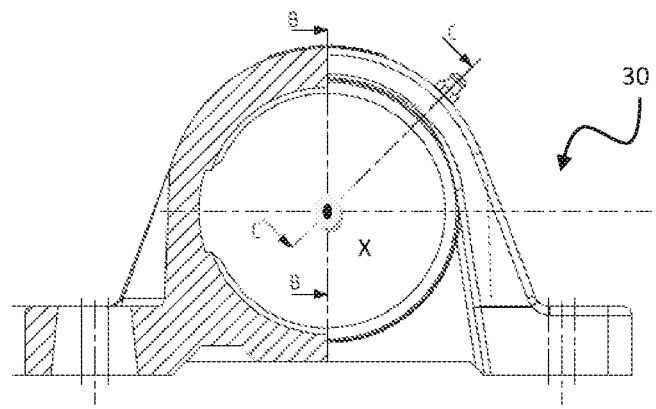
Fig. 5
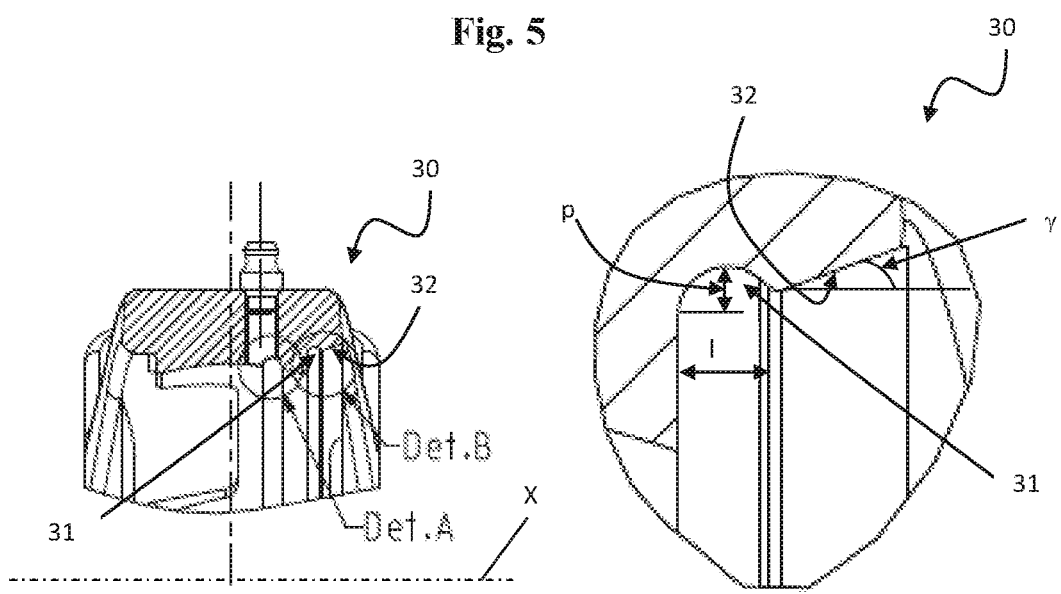
Fig. 6 (Sez. C-C)
Fig. 7 (Det. B)

SYSTEM FOR SECURING TOGETHER BY MEANS OF PRESS-FITTING A CASING AND A COVER OF A HOUSING ELEMENT

CROSS REFERENCE TO RELATED APPLICATION

This application is based on and claims priority to Italian Application No. 102019000015412, filed Sep. 3, 2019, under 35 U.S.C. § 119, the entire contents of which are incorporated herein by reference.

FIELD

The present disclosure relates to housing elements for applications in the heavy manufacturing industry and in particular to a system for securing together a casing and a cover of a housing element.

BACKGROUND

In the manufacturing industry, in particular in the heavy manufacturing industry, attention is being increasingly focused on developing new machines and machine designs that are intended to improve the level safety in a working environment.

BRIEF DESCRIPTION OF THE DRAWINGS

Various embodiments of the invention will now be described with reference to the attached drawings, in which:

FIG. 3 shows a detail of an end portion of a cover in accordance with this disclosure, which forms part of the securing system according to some embodiments;

FIG. 4 is an axonometric view of a cover shown in accordance with this disclosure;

FIG. 5 shows a cross-sectional view of a casing of a same housing element in accordance with this disclosure;

FIG. 6 is a partial axially cross-sectional view of a casing in accordance with this disclosure;

FIG. 7 shows a detail of a groove and a flat mounting surface of a casing, which forms part of a securing system in accordance with this disclosure;

DETAILED DESCRIPTION

Embodiments in accordance with the present disclosure ensure a reliable system for securing together a casing and cover which are both made of metallic material. Such a securing system must be able to withstand heavy loads since the applications involved require a high degree of strength. Exemplary applications of a housing element according to the present disclosure include: mining sector applications, automobile industry applications, agricultural machine applications, and industrial installation applications.

One of the problems to be solved for those operating in the sector is that of ensuring an effective system for securing together casing and cover of a bearing unit housing element which may be used for processing operations of various kinds and are therefore fixed to a frame of a machine. These housing elements may be made of composite material, typically plastic material or metallic material, typically cast iron or steel.

A metal cover may withstand higher static loads and impacts than covers made of plastic. For this reason and since the aforementioned applications for the housing elements in question are very demanding and subject to high loads, an end cover made of metal is the best solution for protecting a bearing inside a casing from contaminating agents in the external environment.

Although applications employing a cover made of metallic material (cast iron or steel) are known in this specific industrial sector, there is a known and great need in the industry for an optimized securing system that is able to withstand high loads, and in particular high loads associated with the excess pressure from the inside of the bearing unit while at the same time allows simple and stable assembly of the cover on the casing is not yet known.

There therefore exists the need to design a securing system which is suitable for joining together a metal casing, for example made of cast iron, and a cover likewise made of metallic material, for example steel, and which is able to solve the aforementioned problems.

With reference now to the aforementioned figures, below an embodiment of the present invention is described purely by way of example.

Figure 1:
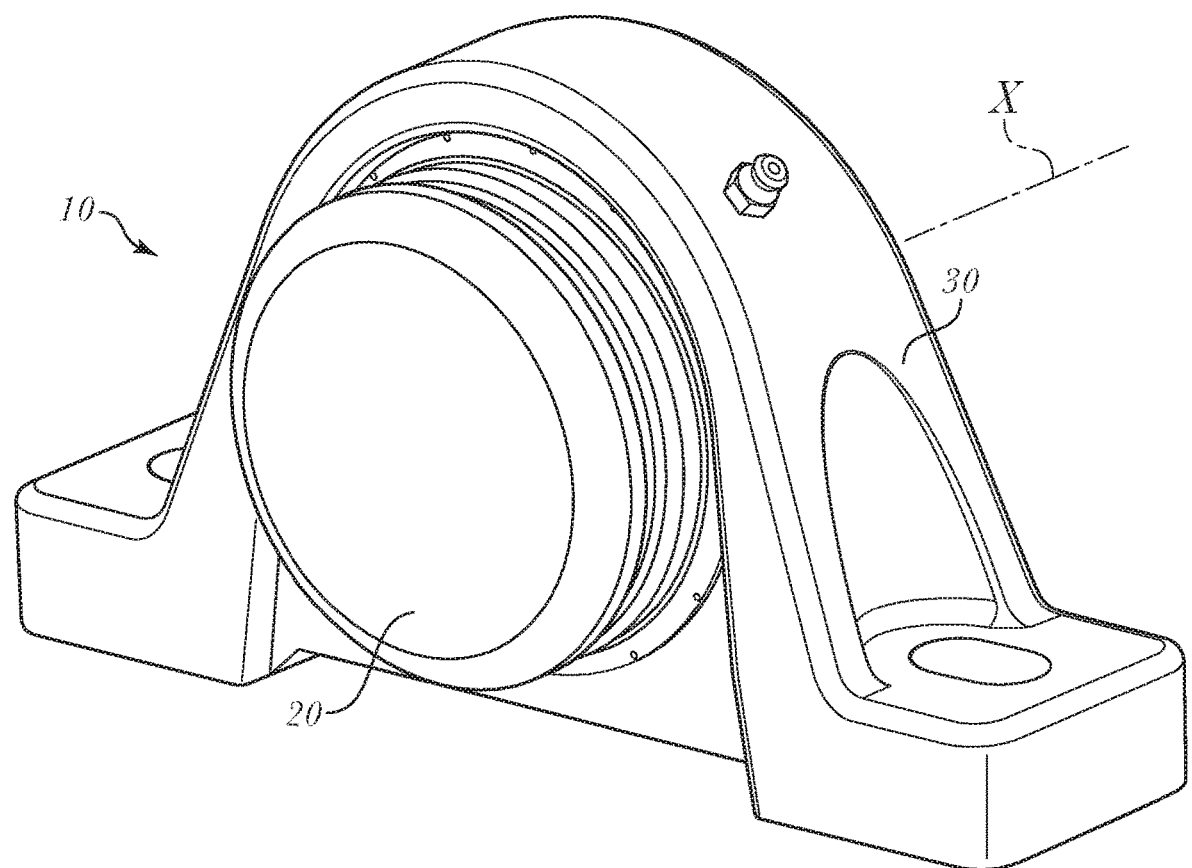
FIG. 1 shows an axonometric view of a housing element in accordance with this disclosure, comprising a casing made of cast iron and a cover made of metallic material which is secured by means of press-fitting onto the casing.
Figure 2:
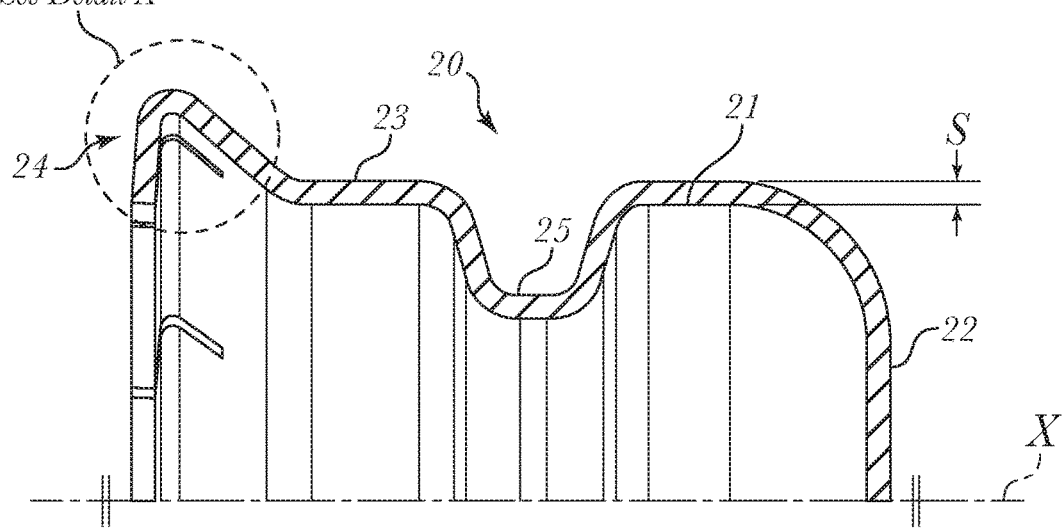
FIG. 2 shows a cross-sectional view of a cover in accordance with this disclosure.

With reference to FIG. 1, the housing element 10 for applications in the heavy manufacturing industry comprises a casing 30 (see also FIG. 5) and a cover 20 (see also FIG. 2). In some embodiments a casing 30 is made of cast iron. In some embodiments, a cover 20 is made of metallic material. In some embodiments, a cover 20 is made of steel. In some embodiments, this housing element may be used in industrial applications for fixing against a machine frame.

With reference to FIG. 2, the cover 20 has an axial-symmetric shape around an axis X. It is formed by a metal sheet 21 with a thickness "S" of between about 0.8 mm and 1.2 mm. One will appreciate that cover thickness will be determined based on a specific application and the demands of a particular design, such that in some applications thickness S may be more or less than 0.8 mm and 1.2 mm. In some industrial applications a thickness "S" is between 0.8 mm and 1.2 mm. In embodiments, thickness "S" is between 0.9 and 1.1 mm. In embodiments, thickness "S" is between 0.95 and 1.05 mm. In some exemplary embodiments for industrial applications, the thickness of the sheet 21 will be equal to about 1 mm. In some embodiments of a cover made of steel the thickness is 1 mm. In the configuration shown in FIG. 2, the cover has a closed bottom wall 22. In some embodiments, however, a cover is of the "open" type, "open" being understood as meaning that the bottom wall of such a cover is open so that it may be crossed by a shaft connected to the machinery onto which an embodiment of housing element 10 is fixed. A side wall 23 of cover 20 has a more or less cylindrical progression, except for an end portion 24 and an intermediate portion 25.

Thickness of the metal sheet 21 of the cover, being relatively small, is useful for increasing the flexibility of the cover 20 during assembly of a casing, as will be explained more fully below. The flexibility is very important in the region of a securing system, but at the same time other portions of the cover must be as rigid as possible. For this reason, an intermediate portion 25 of side wall 23 has an annular groove which increases the rigidity of the cover 20.

With reference to FIG. 3, end portion 24 of cover 20 forms part of a securing system and is shown in greater detail in this figure. End portion 24 comprises frustoconical side wall 26 and an oblique annular bottom wall 27. An angle α of between 50° and 60° is provided between the frustoconical side wall 26 and the bottom wall 27. In some embodiments an angle α is between 53 and 57 degrees. In some embodiments an angle is between 54.5 degrees and 55.5 degrees. According to some embodiments this angle may be equal to a 55°. A frustoconical side wall 26 also forms an angle β with respect to the axial direction defined by the axis X, the size of this angle being of fundamental importance for ensuring an optimum securing action. A preferred value of the angle β is 42°, but this value may be combined with a characteristic feature of the casing 30, as will be explained below. Also important is the value of the connecting radius "r" between the frustoconical side wall 26 and the bottom wall 27. In some embodiments a connecting radius is about 1 mm. In some embodiments, a connecting radius (r) is greater than 1 mm. In some embodiments, a connecting radius (r) is between about 1 mm, and about 1.5 mm. In some embodiments, a connecting radius is 1.5 mm.

Another advantageous characteristic feature of the cover 20 is shown in FIG. 4. End portion 24 of cover 20 is provided with a plurality of radial incisions 28. In some embodiments, such incisions are have a size of between 0.7 mm and 1 mm. In some embodiments, the number of incisions may vary between 12 and 18. The radial incisions 28 define a corresponding plurality of circumferential segments 29. An exemplary embodiment has fifteen radial cuts with a size of 0.7 mm and correspondingly fifteen circumferential segments 29 are provided. The plurality of circumferentially equidistant cuts 28 which are formed on end portion 24 of a cover 20 helps increase the flexibility of the cover itself in the zone where it is secured to casing 30. In fact, angle α as described herein allows each segment 29 to be flexible like a proper elastic element which may be engaged inside grooves of a casing 30. In embodiments each segment is plastically flexible sufficient to enable engagement inside grooves of a casing 30.

A casing 30 is shown in FIGS. 5 and 6. Both components, i.e., a casing 30 and a cover 20, have an axis of symmetry X which, once a cover has been mounted on a casing, coincides, and for this reason it has been indicated by the same symbol X. In particular, in FIG. 6 it is possible to see elements of casing 30 which form part of a securing system in accordance with this disclosure in connection with the cover 20. It consists of a groove 31 which houses the end portion 24 of the cover 20, and the flat mounting surface 32 of the casing 30, which facilitates the insertion of the end portion 24 of the cover 20 inside the groove 31 of the casing.

The two elements of a casing 30 are shown in greater detail in FIG. 7. In some embodiments herein, a groove 31 may have a length "l" for example equal to about 3 mm and a depth "p" equal for example to about 0.7 mm. A size of a groove 31, as explained below, is linked to the value of the angle α defined between a frustoconical side wall 26 and a bottom wall 27 of a cover 20.

A flat mounting surface 32 of a casing 30 forms an angle γ with respect to the axial direction A value of γ is of fundamental importance for ensuring an optimum securing action. A preferred value of angle γ s equal to 20°, but this value must be combined with the value of the angle β defined between a frustoconical side wall 26 of a cover 20 and the axial direction.

A fundamental principle underlying this disclosure is that of using a securing system of the press-fitting or snap-engaging type in order to lock cover 20 on casing 30. Owing to the particular securing arrangement of a cover 20 as described herein, cover 20 itself may be relatively flexible so that it can be inserted inside a groove 31 of a casing 30 without using excessive force, so that it may be assembled manually.

Figure 8:
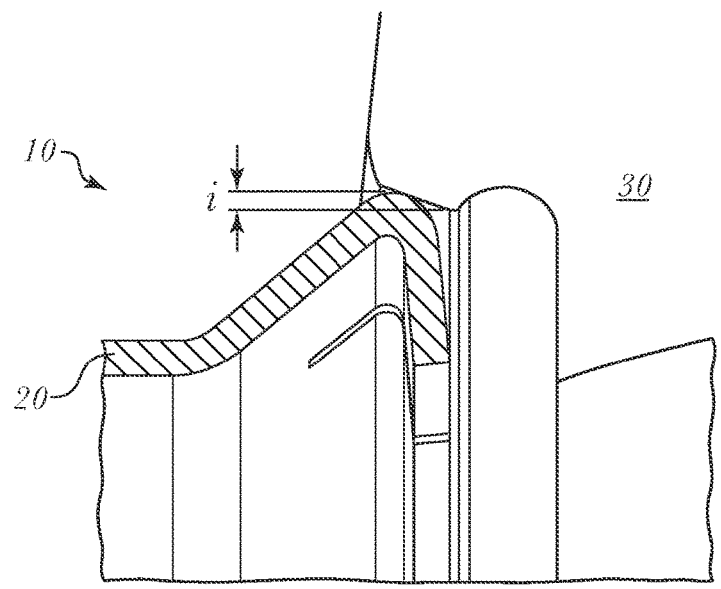
FIG. 8 shows in schematic form a press-fitting assembly of a cover on a casing during an initial step in accordance with this disclosure.
Figure 9:
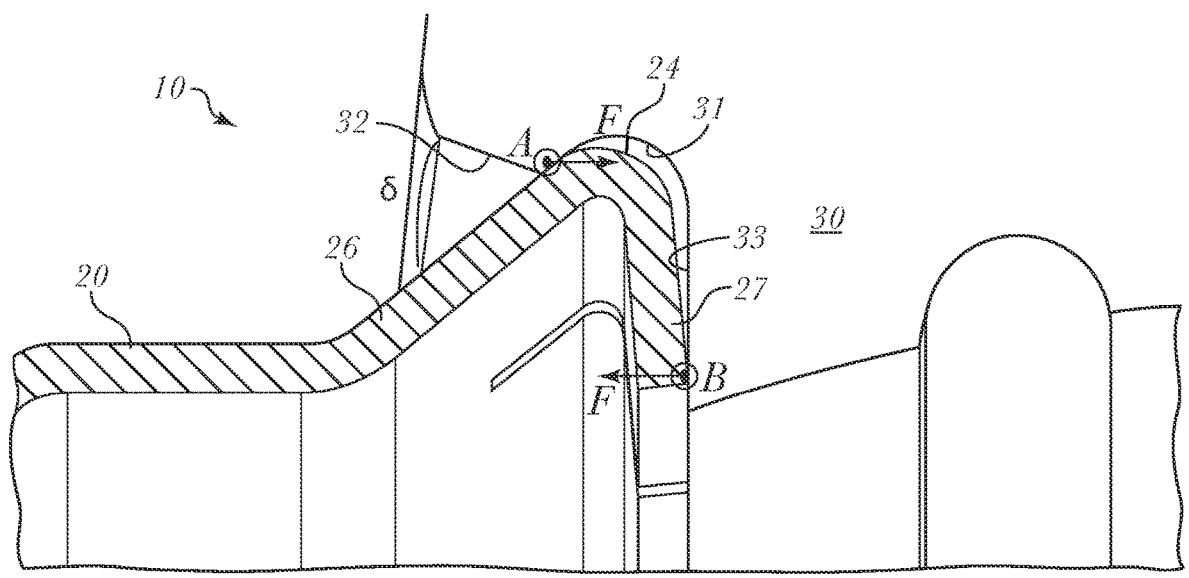
FIG. 9 shows in schematic form a press-fitting assembly of a cover on a casing during a final step in accordance with this disclosure.

With specific reference to FIGS. 8 and 9, show a detail of the zone for securing together a cover 20 and a casing 30 and, which schematically illustrate, respectively, a press-fitting assembly of a cover 20 onto a casing 30 during an initial step and during a final step, these being two parameters fundamental for ensuring assembly which is both reliable and resistant to any excess pressure resulting from inside a casing 30 and which may be performed with ease, for example manually.

A first parameter (see FIG. 8) is an interference between a radially outer end of end portion 24 of a cover 20 and a radially inner end of a flat mounting surface 32 of the casing 30. Too high a value of this interference would make manual assembly of the cover 20 problematic or would risk, once assembly has been performed, permanently deforming the end portion 24 of the cover 20, negatively affecting the stability of the said securing system. On the other hand, too low a value of the interference would likewise negatively affect the stability of the system for securing together cover and casing. Experimental tests carried out on prototypes as described herein have shown that the value of the interference "i" must be between the 0.2 mm and 0.5 mm. A preferred value is equal to 0.4 mm.

A second fundamental parameter for correct securing of a cover 20 on the casing 30 (see FIG. 9 in this connection) is the angle δ which is created between the frustoconical side wall 26 of the end portion 24 of the cover 20 and the flat mounting surface 32 of the casing 30. The angle δ, based on simple geometrical calculations, is equal to the sum of the angles β and γ described above. It is pointed out that angle β is the inclination of the frustoconical side wall 26 with respect to the axial direction defined by the axis X and its reference value may be equal to 42°, while angle γ is the inclination of the flat mounting surface 22 of the casing 30 again with respect to the axial direction and its reference value may be equal to 20°. Too high a value of the angle δ, in any case a value higher than 90°, would make manual assembly of the cover 20 problematic, namely there would the risk of the cover sticking on the surface of the casing without being able to reach the groove in the casing. On the other hand, too low a value of the angle δ would negatively affect the stability of the system for securing together cover and casing. The same experimental tests carried out on prototypes have shown that the value of the angles δ must be between 45° and 80°. In some embodiments described herein a preferred value is equal to 62°. Clearly, a size of angle δ swill be linked to particularly sizes of angles β and γ.

Basically, by correctly defining the size of angle δ, namely keeping said angle in any case at values of less than 90°, end portion 24 of cover 20 does not adhere perfectly to flat mounting surface 32 of the casing 30, but merges with and slides on this surface until it is located inside groove 31 of casing 30.

Advantageously, additional measures further improve the ease of assembly. A first measure is that of machining with good finishing tools the flat mounting surface 32 of the casing 30 in order to reduce as far as possible the roughness and consequently the frictional force which would prevent sliding of an end portion 24 of a cover 20 so as to enter into groove 31 of a casing 30. A second measure consists in suitably defining the size of the connecting radius "r" (see FIG. 3) between a frustoconical side wall 26 and a bottom wall 27 of an end portion 24 of a cover 20. As already mentioned, a connecting radius "r" must be greater than the 1 mm and preferably equal to 1.5 mm. A suitable size of the connecting radius "r" also allows end portion 24 of cover 20 to slide better on a flat mounting surface 32 of a casing 30 so as to be able to enter into a groove 31 of a casing 30.

As already mentioned, assembly of the cover 20 on the casing 30 is facilitated by a plurality of cuts, e.g., radial incisions 28, which are formed circumferentially equidistant on an end portion 24 of the cover 20. Corresponding segments, e.g., 29, formed as a result of such a plurality of cuts help increase the flexibility of a cover itself in a zone where it is secured to a casing 30. Since they behave in the manner of elastic elements, segments 29 may engage inside groove 31 of a casing 30 one at a time or a few at a time, thereby facilitating manual assembly.

In some embodiments, once an end portion 24 of a cover 20 has been inserted inside a groove 31 of a casing 30, as can be seen in FIG. 9, two mating surfaces A and B making contact between the cover 20 and casing 30 will be created. The two contact surfaces are produced as a result of suitable correlation of the value of the angle α between the frustoconical side wall 26 and the bottom wall 27 of the end portion 24 of the cover with the dimensions—length and depth—of the groove 31 in the casing 30. In this way, in these embodiments the end portion 24 of the cover 20 will be suitably pre-stressed inside the groove 31, resulting in the two contact surfaces and consequent reaction forces between casing and cover.

The theoretical contact surfaces A and B, in view of the axial-symmetry of the two components, are two circumferences. In reality the approximation with a circumference is fairly accurate as regards the surface A, since it does not have notable deformations in that zone, while the contact surface B is in reality a circular rim since the end portion of the cover 24 which makes contact with the casing 30 is folded and inclined onto the annular surface 33 of the casing 30. This elastic flexing generates a force F on the contact surface B which is balanced by the force F having the same intensity, but acting in the opposite direction, arising on the contact surface A. In this way, the securing action between cover 20 and casing 30 will be stable.

Since, as has been seen, a system for securing together a cover and casing is very stable, disassembly of such two components cannot be performed manually, but only using suitable equipment. This equipment may consist also of a simple screwdriver tool which may exert leverage by acting inside the annular groove of the intermediate portion 25 of the side wall 23 of the cover 20.

One object of the present invention is to provide a housing element for applications in the heavy manufacturing industry that is provided with a press-fitting securing system for a casing and a cover, where the casing is made of metallic material, preferably cast iron, and the cover is likewise made of metallic material, preferably steel.

The object of the present invention is achieved by using for the housing element a casing with at least one groove and a flat mounting surface joined together with a cover having an end portion comprising a frustoconical shaped wall and an oblique annular bottom wall. During closure, the end portion of the cover engages inside the groove of the casing and a hermetic closure is ensured by the fact that the engagement between the end portion of the cover and groove of the casing is a press-fitting engagement. The end portion makes contact with two areas where the forces exchanged between the two components have an axially opposite progression and therefore result in a stable securing system.

An underlying idea of the present disclosure is to use a press-fitting, i.e., snap-engagement, securing system for locking the cover onto the casing. Owing to the particular securing arrangement of the cover, the cover itself remains fairly flexible so that it may be inserted in the groove of the casing without having to use excessive force, in such a way therefore that it may be manually assembled.

The flexibility of the assembly operation is due to a suitably defined value for the interference between the end portion of the cover and the flat mounting surface of the casing.

It is also associated with the inclination of the flat mounting surface of the casing which, together with the inclination of the frustoconical wall of the cover, allows an overall angle of less than 90° to be created between the flat mounting surface of the casing and the end portion of the cover. Since the overall angle which is formed is less than 90°, the cover does not adhere perfectly to the flat surface, and therefore does not stick, but instead slides over this flat mounting surface until the end portion is situated inside the groove of the casing.

According to another aspect, the flexibility during assembly is also ensured by a plurality of cuts which are arranged circumferentially equidistant on the end portion of the cover. Owing to this plurality of cuts, each end portion segment thus formed may be independent and be singly inserted inside the groove of the casing.

Preferably, the angle which is created between the frustoconical wall of the cover and the oblique annular bottom wall allows each end portion segment to be flexible in the manner of an elastic element and to snap-engage inside the groove of the casing.

Therefore, according to the present invention a housing element for applications in the manufacturing industry is described, said housing element being provided with a system for securing together a casing and a cover, both made of metallic material and having the characteristic features indicated in the independent claim attached to the present description.

Further preferred and/or particularly advantageous embodiments of the invention are described in accordance with the characteristic features indicated in the attached dependent claims.

In an exemplary embodiment, a housing element for applications in the manufacturing industry comprising a casing and a lid both of metallic material, the casing is provided with a groove and a flat mounting surface, and the cover is provided with an end portion comprising a truncated cone-shaped side wall and an annular and oblique bottom wall. The housing element is a system for anchoring the cover on the casing. The end portion of the cover is configured to be disposed in the groove of the casing which is configured to have an interference (i) between a radially outer end of the end portion of the cover and a radially inner end of the flat mounting surface of the casing assumes values comprised between 0.2 mm and 0.5 mm to facilitate the insertion of the end portion of the cover in the groove of the casing, and an angle α defined between the truncated cone-shaped side wall of the end portion of the cover and the flat mounting surface of the casing has a value of between 45° and 80°, said angle being equally useful for facilitating the insertion of the end portion of the cover in the groove of the casing.

In some embodiments, a housing element's interference is 0.4 mm and the angle α is 62°.

In some embodiments, a housing element includes an angle (α) ranging between about 50° and about 60° formed between the truncated cone-shaped side wall and the bottom wall of the end portion of the cover.

In some embodiments, a housing element includes an end portion of the cover with a plurality of radial cuts, or incisions.

In some embodiments, a housing element includes an end portion of the cover with a plurality of radial cuts, or incisions, having a size ranging from 0.7 mm to 1 mm numbering between 12 and 18.

In some embodiments, a housing element has a connecting radius (r) between the truncated cone-shaped side wall and the bottom wall of the end portion of the cover. In embodiments the radius has a size greater than 1 mm.

In some embodiments, a housing element includes a truncated cone-shaped side wall having an angle (β) with respect to an axial direction defined by an axis (X) and whose value is about 42°.

In some embodiments, a housing element includes a groove of a casing having a length (l) of about 3 mm and a depth (p) of about 0.7 mm, said values of the length (l) and of the depth (p) being related to the value of the angle (α) defined between the truncated cone-shaped side wall and the bottom wall of the end portion of the cover.

In some embodiments, a housing element has a flat mounting surface of the casing that forms an angle (γ) whose value is about 20°, said value being correlated with the value of the angle (β) defined between the truncated cone-shaped side wall of the cover and the axial direction.

In some embodiments, a housing element includes a cover that has an axisymmetric shape around the axis (X) and is formed by a metal sheet of thickness (S) comprised between 0.8 mm and 1.2 mm.

In some embodiments, a housing element includes a cover having a side wall provided with the end portion and an intermediate portion which has an annular groove to increase the stiffness of the cover.

In addition to the embodiments of the invention, as described above, it is to be understood that numerous further variants are possible. It must also be understood that said embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

The invention claimed is:

1. A housing element comprising:
a metallic casing comprising an internal annular groove and a flat mounting surface extending from an edge of the internal annular groove at an oblique angle with respect to an axial direction, and
a metallic cover comprising: an end portion comprising a truncated cone-shaped side wall, and an annular bottom wall, the annular bottom wall extending inwardly from the end portion at an oblique angle, wherein the metallic casing and the metallic cover are configured such that a radially measured interference (i) between a radially outer end of the end portion of the cover and a radially inner end of the flat mounting surface of the metallic casing is between 0.2 mm and 0.5 mm, and
an angle (δ) defined between the truncated cone-shaped side wall of the end portion of the cover and the flat mounting surface of the metallic casing comprises values between 45° and 80°.

2. The housing element of claim 1, wherein the interference (i) comprises 0.4 mm and the angle (δ) comprises 62°.

3. The housing element of claim 1, wherein the truncated cone-shaped side wall and the bottom wall of the end portion of the cover define an angle (α) ranging between 50° and 60°.

4. The housing element of claim 1, wherein the end portion of the cover is provided with a plurality of radial cuts of a size ranging from 0.7 mm to 1 mm.

5. The housing element of claim 4, wherein the plurality of radial cuts includes between 12 and 18 radial cuts.

6. The housing element of claim 1, wherein the truncated cone-shaped side wall and the bottom wall of the end portion of the cover define a connecting radius (r) that is greater than 1 mm.

7. The housing element of claim 1, wherein the truncated cone-shaped side wall has an angle (β) with respect to an axial direction defined by an axis (X) and whose value is about 42°.

8. The housing element of claim 7, wherein the flat mounting surface of the metallic casing forms an angle (γ) whose value is about 20°, said value being correlated with the value of the angle (β) defined between the truncated cone-shaped side wall of the cover and the axial direction.

9. The housing element of claim 1, wherein the groove of the metallic casing has a length (l) of about 3 mm and a depth (p) of about 0.7 mm, said values of the length (l) and of the depth (p) being related to the value of the angle (α) defined between the truncated cone-shaped side wall and the bottom wall of the end portion of the cover.

10. The housing element of claim 1, wherein the cover comprises an axisymmetric shape around the axis (X) and is formed by a metal sheet of thickness (s) comprised between 0.8 mm and 1.2 mm.

11. The housing element of claim 1, wherein the cover comprises a side wall provided with the end portion and an intermediate portion which comprises an annular groove to increase the stiffness of the cover.

12. The housing element of claim 1, wherein the metallic casing comprises cast iron and the metallic cover comprises steel.

13. A housing element comprising:
a metallic casing comprising an internal annular groove and a flat mounting surface extending from an edge of the internal annular groove at an oblique angle with respect to an axial direction, and
a metallic cover comprising: an end portion comprising a truncated cone-shaped side wall, and an annular bottom wall, the annular bottom wall extending inwardly from the end portion at an oblique angle, wherein the metallic casing and the metallic cover are configured such that a radially measured interference (i) between a radially outer end of the end portion of the cover and a radially inner end of the flat mounting surface of the metallic casing is between 0.2 mm and 0.5 mm, and
an angle (δ) defined between the truncated cone-shaped side wall of the end portion of the cover and the flat mounting surface of the metallic casing comprises values between 45° and 80°, wherein the interference (i) comprises 0.4 mm and the angle (δ) comprises 62°, further wherein the truncated cone-shaped side wall and the bottom wall of the end portion of the cover define an angle (α) ranging between 50° and 60°, further wherein the end portion of the cover is provided with a plurality of radial cuts of a size ranging from 0.7 mm to 1 mm, further wherein the truncated cone-shaped side wall and the bottom wall of the end portion of the cover define a connecting radius (r) that is greater than 1 mm, further wherein the truncated cone-shaped side wall has an angle (β) with respect to an axial direction defined by an axis (X) and whose value is about 42°, further wherein the groove of the metallic casing has a length (l) of about 3 mm and a depth (p) of about 0.7 mm, said values of the length (l) and of the depth (p) being related to the value of the angle (α) defined between the truncated cone-shaped side wall and the bottom wall of the end portion of the cover, further wherein the flat mounting surface of the metallic casing forms an angle (γ) whose value is about 20°, said value being correlated with the value of the angle (β) defined between the truncated cone-shaped side wall of the cover and the axial direction, further wherein the cover comprises an axisymmetric shape around the axis (X) and is formed by a metal sheet of thickness (s) comprised between 0.8 mm and 1.2 mm, wherein the cover comprises a side wall provided with the end portion and an intermediate portion which has an annular groove to increase the stiffness of the cover.

14. The housing element of claim 13, wherein the metallic casing comprises cast iron and the metallic cover comprises of steel.

* * * * *